US006707485B1

(12) United States Patent
Higuchi et al.

(10) Patent No.: US 6,707,485 B1
(45) Date of Patent: Mar. 16, 2004

(54) LIGHT CONTROL SYSTEM FOR ELECTRONIC ENDOSCOPES

(75) Inventors: Mitsuru Higuchi, Omiya (JP); Shinji Takeuchi, Omiya (JP); Kazuhiro Yamanaka, Omiya (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/253,765

(22) Filed: Feb. 22, 1999

(30) Foreign Application Priority Data

Feb. 27, 1998 (JP) .......................... 10-064841
Mar. 2, 1998 (JP) .......................... 10-066194

(51) Int. Cl.$^7$ .......................... H04N 7/18; H04N 9/47; H04N 5/222; H04N 5/235
(52) U.S. Cl. .......................... 348/69; 348/61; 348/68; 348/362; 348/370; 348/371
(58) Field of Search .......................... 348/69, 68, 370, 348/371, 362; 600/109; 396/17; 359/230

(56) References Cited

U.S. PATENT DOCUMENTS

| | | | | |
|---|---|---|---|---|
| 4,219,014 A | * | 8/1980 | Oshiro et al. ............... | 600/109 |
| 4,298,260 A | * | 11/1981 | Takayama ................... | 396/17 |
| 4,310,228 A | * | 1/1982 | Terada ........................ | 396/17 |
| 4,322,129 A | * | 3/1982 | Takahashi et al. .......... | 359/230 |
| 4,331,403 A | * | 5/1982 | Ohno .......................... | 396/17 |
| 4,343,300 A | * | 8/1982 | Hattori ....................... | 600/109 |
| 4,403,605 A | * | 9/1983 | Tanikawa ................... | 600/109 |
| 4,429,686 A | * | 2/1984 | Hosoda ...................... | 600/109 |
| 4,524,761 A | * | 6/1985 | Hattori et al. .............. | 600/109 |
| 4,561,429 A | * | 12/1985 | Sato et al. .................. | 600/109 |
| 5,115,261 A | * | 5/1992 | Noda et al. ................. | 396/17 |

* cited by examiner

*Primary Examiner*—Chris Kelley
*Assistant Examiner*—Allen Wong
(74) *Attorney, Agent, or Firm*—Snider & Associates; Ronald R. Snider (57) ABSTRACT

The present invention relates to a light control system for electronic endoscopes which provides sufficiently bright images during observation of distant objects, allows stable light control during observation of close objects, and prolongs lamp life. The light control system comprises a CCD drive circuit for controlling a CCD, a microcomputer, a diaphragm drive circuit for driving a diaphragm, a lamp voltage control circuit for variably controlling lamp voltage, and a DVP for generating a luminance signal, wherein the diaphragm drive circuit controls the opening of the diaphragm based on the luminance signal received from the DVP and a constant voltage V1 is normally supplied to the lamp, but a larger voltage up to V2 may be supplied on instructions from the microcomputer if the luminance of an image is insufficient even with the diaphragm fully open. In an embodiment with an electronic shutter circuit, a control is performed so that the lamp voltage will be raised similarly up to V2 only when the amount of light is insufficient even with the electronic shutter set at the lowest speed. Thus, the lamp normally lights at low voltage and glows at high voltage only when the long range observation or the like, constantly providing the optimum amount of light.

2 Claims, 6 Drawing Sheets

LIGHT CONTROL SYSTEM FOR ELECTRONIC ENDOSCOPES

BACKGROUND OF THE INVENTION

This application claims the priority of Japanese Patent applications No. 10-64841 filed on Feb. 27, 1998 and No. 10-66194 filed on Mar. 2, 1998 which are incorporated herein by reference.

1. Field of the Invention

The present invention relates to a light control system for electronic endoscopes, and more particularly, to an arrangement for regulating the amount of light emitted to the object under observation by the use of a diaphragm to obtain sharp images even during observation of distant objects.

2. Description of the Prior Art

In the electronic endoscope systems, a charge coupled device (CCD), for example, is used as a solid-state image sensor. CCD relies on photoelectric conversion elements for reading stored electric charges corresponding individual pixels to obtain picture signals (video signals). Besides, a light source section (or a separate light source unit) is provided to supply illumination light inside the body under observation. In this light source section it is designed to provide the optimum amount of light by means of a diaphragm control mechanism.

That is, the video signal outputted from the CCD is supplied, for example, to a digital video processor (DVP), etc. where a color-difference signal, luminance signal, etc. are generated. The luminance signal is supplied to the diaphragm drive circuit as a control signal for adjusting the brightness of the screen. The diaphragm drive circuit drives the diaphragm so as to keep the luminance signal constant; and acts to open the diaphragm if the luminance signal is below a given reference value, and acts to close the diaphragm if the luminance signal is above the reference value. This variable control of the diaphragm opening varies the amount of light emitted from the distal end of the endoscope, allowing the brightness of images to be kept constant.

Also, an electronic shutter function may be used for drive control of the CCD described above. It regulates the amount of received light (light exposure) via variable control of pixel data, i.e., the storage time of the electric charges. More particularly, the video signal outputted from the CCD is converted into a color-difference signal and luminance signal by means of, for example, a digital video processor (DVP), and the electronic shutter is operated according to this luminance signal. For example, if the luminance signal is below a given reference value, the shutter speed is decreased to increase the amount of light received, and if the luminance signal is above a given reference value, the shutter speed is increased to decrease the amount of light received. This provides the exposure suitable for the object under observation, maintaining the brightness of the screen in good condition.

BRIEF SUMMARY OF THE INVENTION

Object of the Invention

However, conventional electronic endoscope systems have a problem that if the object under observation is located at a significant distance in a deep cavity or the like, the light emitted from the distal end of the endoscope will not reach the object under observation, resulting in a deficiency in the amount of light (received by the CCD), and thus inability to provide an image bright enough for observation.

Possible means of solving this problem includes, the use of a high-output, bright lamp, and enhancement of the lamp's output or capacity through application of a higher voltage. However, the use of a high-output lamp will entail high cost and abuse of a lamp in excess of its capacity will shorten its life.

Besides, when using diaphragm control with increased light output, the diaphragm must reduce the amount of emitted light greatly during close range observation, making light control unstable. This is because the diaphragm allows the amount of emitted light to be regulated roughly during observation at narrowed aperture, compared to observation at wide aperture.

SUMMARY OF THE INVENTION

The present invention has been made in view of the above problems. The object of the present invention is to offer a light control system for electronic endoscopes that can provide sufficient brightness for long range observation and provide stable amount of light for close range observation, and reduce costs, and prolong lamp life.

To attain the above object, the present invention comprises a light source for illuminating the object under observation, a light-source voltage control circuit for controlling the light-source voltage to change the brightness of the said light source itself, means for detecting the amount of light received which controls said light-source voltage control circuit, supplies a constant light-source voltage to said light source under normal conditions, and detects the amount of light received by said image sensor, and a control means which raises said light-source voltage only when it is judged, based on the results obtained by said means of detection, that the amount of light received by said image sensor will be insufficient.

Another invention comprises a light source for illuminating the object under observation, a diaphragm for regulating the light output of the light source, a diaphragm drive circuit for driving the diaphragm variably, a light-source voltage control circuit for controlling the voltage of the light source to change the brightness of the light source, and a control means which controls this light-source voltage control circuit by supplying a constant voltage to the light source under normal conditions and raising the voltage of the light source only when it is judged, based on the detected amount of light received by the image sensor, that the amount of light received by the image sensor will be insufficient even with the diaphragm fully open.

In this configuration, the control means detects the amount of light received by the image sensor based on the luminance signal of an image and outputs the control signal for luminance regulation to the diaphragm drive circuit, which drives the diaphragm variably so as to keep the brightness of the image constant. And, if it is judged that the brightness is not sufficient even when the diaphragm is fully open, such a command signal is outputted to the light-source voltage control circuit, instructing it to raise the voltage of the light source. Since this raises the output of the light source higher than usual, sufficient brightness can be obtained even for images of distant objects observed.

Another invention comprises a light source for illuminating the object under observation, an electronic shutter circuit for regulating, by means of electronic shutter speed, the amount of light received by the image sensor, and a control means which controls this light-source voltage control circuit by supplying a constant voltage to the light source under normal conditions and raising the voltage of the light source only when it is judged, based on the detected amount of light received by the image sensor, that the amount of light received by the image sensor will be insufficient even with the electronic shutter set at the lowest speed.

In this configuration, the control means detects the amount of light received by the image sensor based on the luminance signal of an image and outputs the control signal for luminance regulation to the electronic shutter circuit (CCD drive circuit), which variably sets the shutter speed to keep the brightness of the image constant. If it is judged that the brightness is not sufficient even at the lowest electronic shutter speed (with the electronic shutter fully open), it issues a command signal to the light-source voltage control circuit, instructing it to raise the voltage of the light source. This allows sufficient brightness to be obtained even for images of distant objects observed.

DETAILED DESCRIPTION OF THE PREFERRED EMBODIMENTS

First Embodiment

Figure 1:
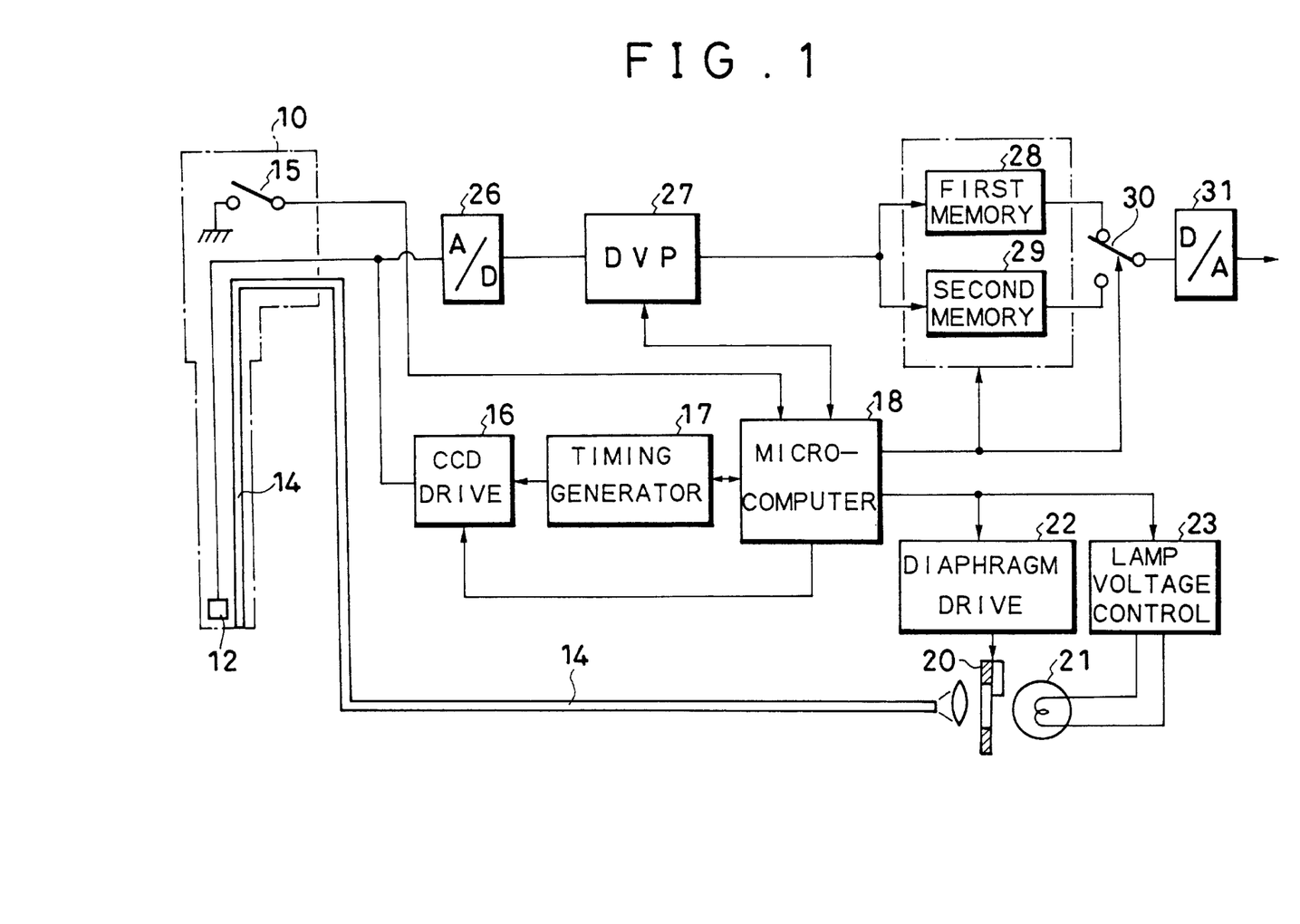
FIG. 1 is a block diagram showing the overall configuration of the light control system for electronic endoscopes according to a first embodiment of the present invention.

FIG. 1 shows the circuit configuration of the light control system for electronic endoscopes according to a first embodiment of the present invention. This electronic endoscope system connects a scope (electronic endoscope) 10 to a processor unit which contains a video processing circuit and to a light source unit (light source section). The scope 10 has a CCD 12 as an image sensor at its distal end and contains a light guide 14 for leading the light from the light source to its distal end. A freeze switch 15 for displaying a still image is provided on the control section of the scope 10.

The CCD 12 is connected with a CCD drive circuit 16 for reading the video signals of the photographed images. The CCD drive circuit 16 is connected with a timing generator 17 as well as a microcomputer 18 for various control including diaphragm control and light-source voltage control to be described later. The microcomputer 18 receives the actuating signal for the freeze switch 15. The CCD drive circuit 16 inputs timing signals under the control of the microcomputer 18 and performs, for example, drive control for mixed readout of pixels (color-difference line-sequential mixed readout scheme) for still or moving images.

The light guide 14 described above is fitted with a diaphragm (movable diaphragm) 20 and a lamp 21 such as a halogen lamp in the light source section through a condensing lens. A diaphragm drive circuit 22 for driving the diaphragm 20 and a lamp voltage control circuit 23 for turning on/off the lamp 21 and controlling the lamp voltage (actuating voltage) are installed in the light source section. The diaphragm 20 and diaphragm drive circuit 22 may be a type that varies the opening (aperture) of the diaphragm 20 either stepwise (with a limited number of stops) or continuously.

The lamp voltage control circuit 23 normally supplies a constant voltage V1 (for example, 13 volts) to the lamp 21, but it may supply a larger voltage Va than the V1 [for example, 13V<Va (15V (V2)] based on instructions from the microcomputer 18 if the luminance of an image is insufficient even with the diaphragm 20 fully open. This makes it possible to supply the optimum amount of light even for long range observation and the like.

The subsequent stage of the CCD 12 is connected, through an A/D converter 26, with a DVP (digital video processor) 27, which acts as a video processing circuit. This DVP 27 can contain an RGB (red, green, blue) matrix circuit, RGB gain circuit, color difference matrix circuit, gamma correction circuit, etc. It generates a luminance signal (Y) and color-difference signal (C). Then the luminance signal is input to the microcomputer 18, from which supplies the control signal for luminance regulation to the diaphragm drive circuit 22, which in turn variably controls the opening of the diaphragm 20 according to this luminance control signal.

The microcomputer 18 checks, based on the above-mentioned luminance signal, whether the current luminance of the image is optimum as well as detects the opening of the diaphragm 20. If it judges that the current luminance of the image is not sufficient even if the diaphragm 20 is fully open, it issues a command signal to the lamp voltage control circuit 23, instructing it to raise the lamp voltage. This command to raise the voltage is executed based on detection of the upper and lower limits of the lamp voltage.

The subsequent stage of the DVP 27 contains a first memory 28 and second memory 29 for storing odd field and even field data respectively, switching circuit 30 for switching between the first memory 28 terminal and second memory 29 terminal, and a D/A converter 31.

Figure 2:
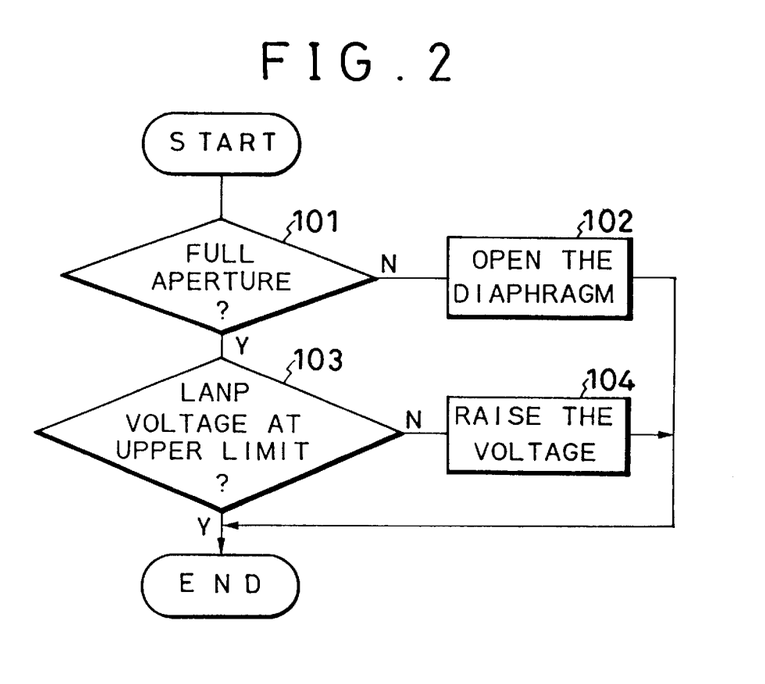
FIG. 2 is a flow chart describing how to increase the amount of light to be emitted according to the first embodiment of the present invention.

Now the operation of the first embodiment, which has the above-mentioned configuration, will be described with reference to FIGS. 2 to 4. FIG. 2 describes how to increase the amount of light to be emitted while FIG. 3 describes how to decrease the amount of light to be emitted. If the microcomputer 18 determines, based on the luminance signal received from the DVP 27, that the amount of light to be emitted needs to be increased, it performs the procedure described in FIG. 2. If it determines that the amount of light to be emitted needs to be decreased, it performs the procedure shown in FIG. 3.

When increasing the amount of light in FIG. 2, the microcomputer 18 determines in Step 101 whether the diaphragm 20 is at full aperture. If the answer is "N (No)", it gives a command signal to the diaphragm drive circuit 22 in Step 102, instructing it to take an action to open the diaphragm 20. If the answer is "Y (Yes)", it goes to Step 103. In Step 103, the microcomputer 18 determines whether the lamp voltage is at its upper limit V2. If the answer is "N", it gives a command signal to the lamp voltage control circuit 23 in Step 104, instructing it to raise the voltage of the lamp voltage. If the answer is "Y", which means control limits, the processing is finished.

Figure 3:
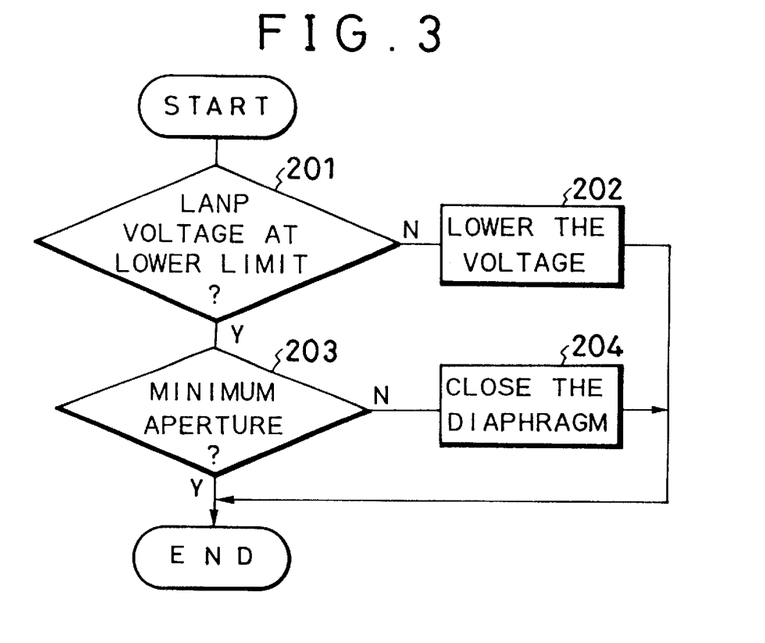
FIG. 3 is a flow chart describing how to decrease the amount of light to be emitted according to the first embodiment of the present invention.

When decreasing the amount of light in FIG. 3, it is determined in Step 201 whether or not the lamp voltage is at its lower limit V1. If the answer is "N", it gives a command signal to the lamp voltage control circuit 23 in Step 202, instructing it to lower the voltage of the light source. If the answer is "Y", it goes to Step 203 to perform normal light amount operation. In Step 203, the microcomputer 18 determines whether the diaphragm 20 is at minimum aperture. If the answer is "N", it gives a command signal to the diaphragm drive circuit 22 in Step 204, instructing it to take an action to close the diaphragm 20. If the answer is "Y", the processing is finished.

Figures 4, 4A, 4B, 4C:
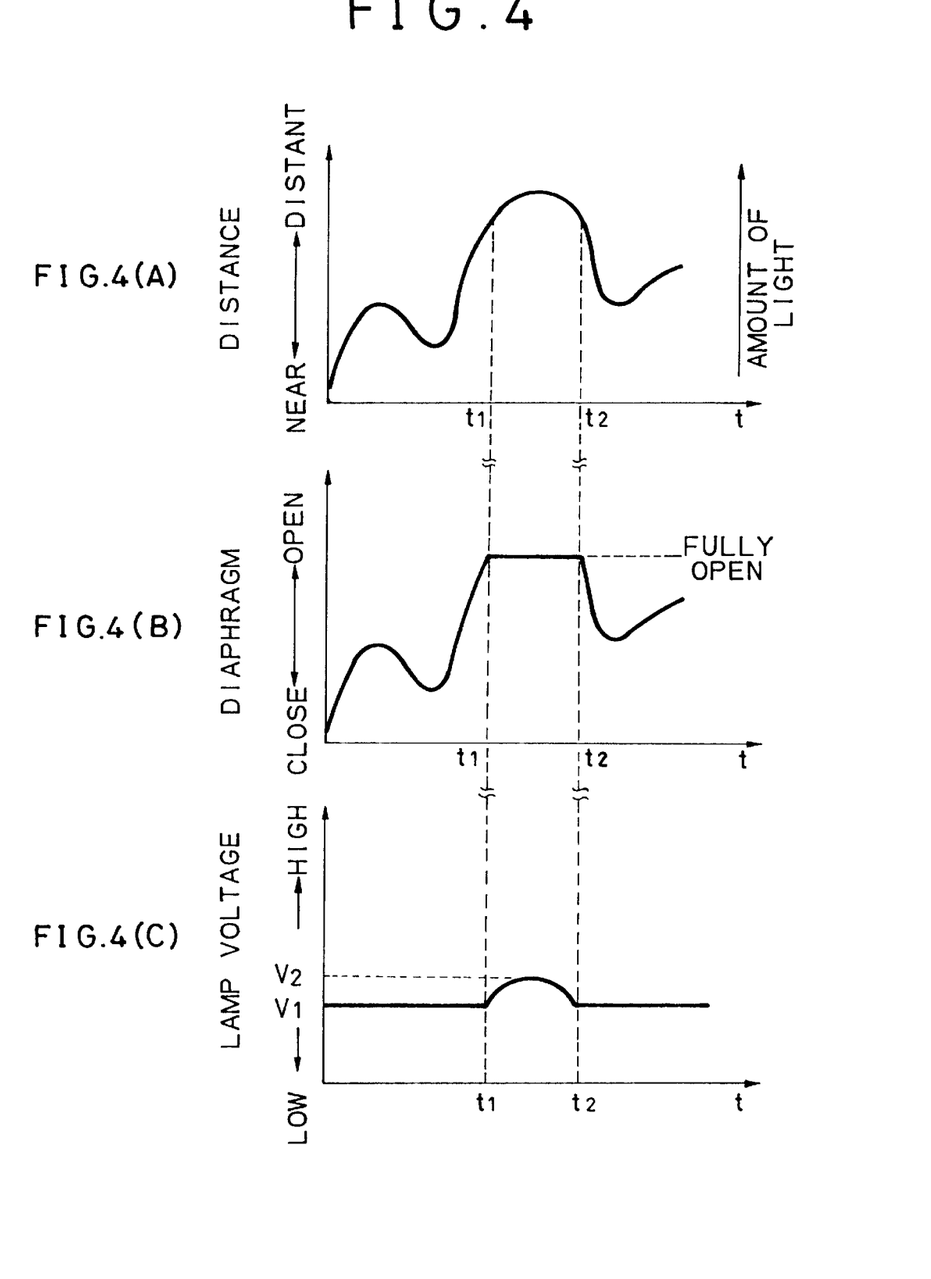
FIGS. 4(A) to 4(C) are diagrams showing states of light control according to the first embodiment of the present invention with FIG. 4(A) representing the relationship between shooting distance and the required amount of light, FIG. 4(B) representing diaphragm control, and FIG. 4(C) representing the control of lamp voltage.

In this way, the amount of light is controlled as shown in FIG. 4. To be more specific, when it is set that the horizontal axis represents time, and the vertical axis represents distance, as shown in FIG. 4(A). And the long-distance section on the vertical axis where a large amount of light is required is considered, the diaphragm 20 reaches the full aperture at t1 in FIG. 4(B), and consequently the amount of light remains insufficient until t2 in the figure. In the range between t1 and t2, however, the lamp voltage is controlled variably between V1 and V2 (for example, in 20 incremental steps of 0.1 V from 13 V to 15 V) according to the distance as shown in FIG. 4(C). This secures the required amount of light in the range between t1 and t2 shown in FIG. 4(A).

Accordingly, it is possible to obtain sufficiently bright images even during long range observation. During close range observation, since the amount of light emitted is not very large with the lamp voltage lowered to V1, the diaphragm 20 is not varied within a range of very small aperture. Therefore, rough light intensity regulation is replaced by stable light control. Furthermore, since the lamp voltage remains at V1, which does not normally abuse the lamp, the life of the lamp is advantageously prolonged.

As described above, the first embodiment provides sufficiently bright images during long range observation and allows stable light control during close range observation. Furthermore, it has the advantage of prolonging the life of the lamp because it does not abuse the lamp.

Second Embodiment

Figure 5:
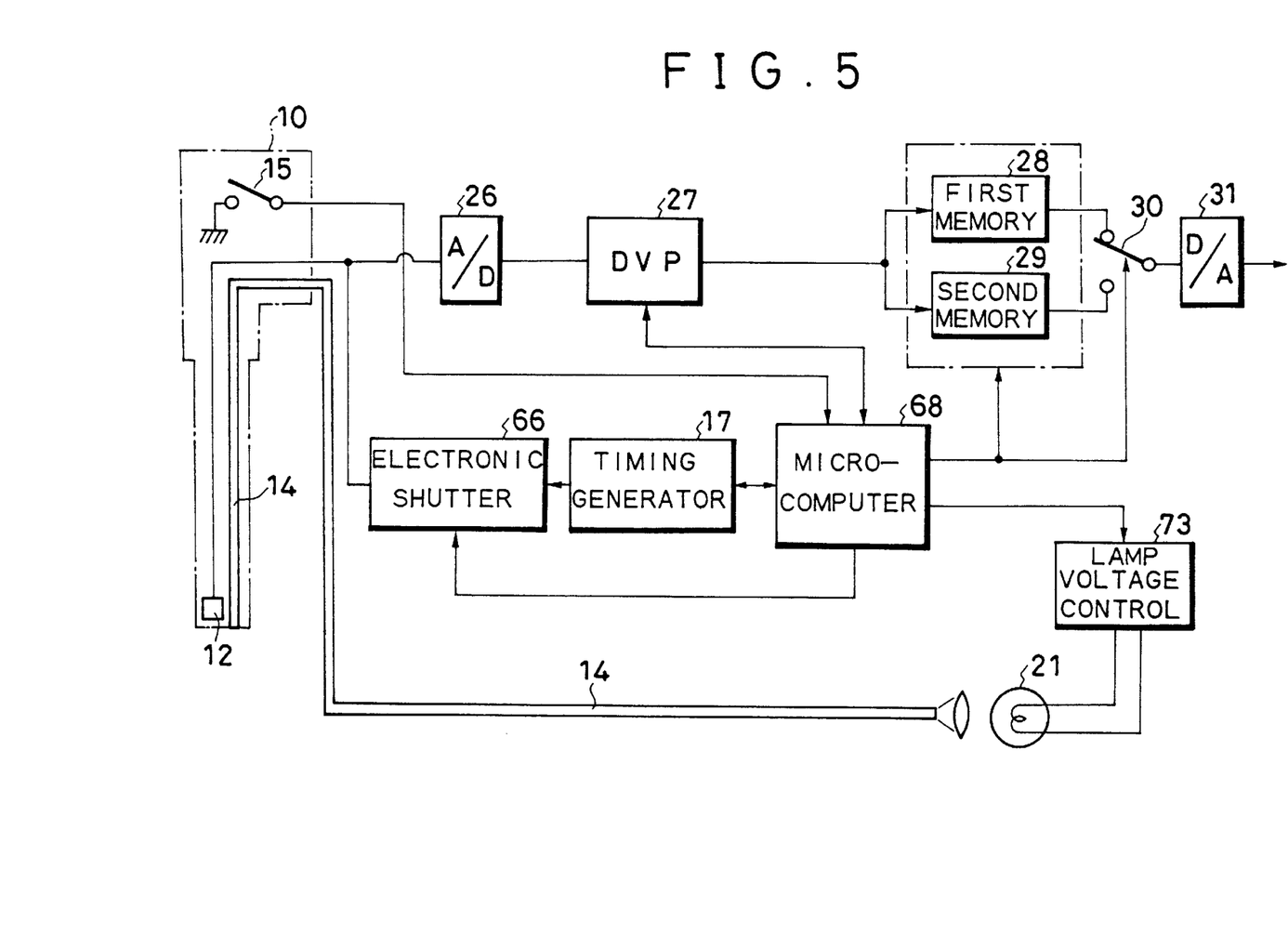
FIG. 5 is a block diagram showing the overall configuration of the light control system for electronic endoscopes according to a second embodiment of the present invention.

FIG. 5 shows the circuit configuration of the light control system for electronic endoscopes according to a second embodiment. The basic configuration of the system is similar to that of the first embodiment. CCD 12 of the electronic endoscope is connected with an electronic shutter circuit 66 which reads the video signals of photographed images while controlling the speed of the electronic shutter. This electronic shutter circuit 66 is the CCD drive circuit of the first embodiment added with an electronic shutter function. This electronic shutter circuit 66 is connected with a timing generator 17 as well as with a microcomputer 68 for various control including light-source voltage control to be described later. The microcomputer 68 receives the actuating signal for the freeze switch 15 described above.

The electronic shutter circuit 66 described above inputs timing signals under the control of the microcomputer 68 and performs, for example, drive control for mixed readout of pixels (color-difference line-sequential mixed readout scheme) for still or moving images. At this time, the storage time of electric charges can be changed by adjusting the discharge time (discharge pulse) of stored electric charges. The storage time of electric charges constitutes the shutter speed (exposure time), which can be set at a value, for example, between the lowest speed of $\frac{1}{60}$ second and the highest speed of $\frac{1}{100,000}$ second.

The light guide 14 described earlier is fitted with a lamp 21 such as a halogen lamp in the light source section through a condensing lens. A lamp voltage control circuit 73 for turning on/off the lamp 21 and controlling the lamp voltage (actuating voltage) is installed in the light source section. The lamp voltage control circuit 73 normally supplies a constant voltage V1 (for example, 13 volts) to the lamp 21, but it may supply a larger voltage Va [for example, 13V<Va (15V (V2)] on instructions from the microcomputer 68 if the luminance of an image is insufficient even with the electronic shutter set at the lowest speed ($\frac{1}{60}$ second). This makes it possible to supply the optimum amount of light even for long range observation and the like.

The subsequent stage of CCD 12 is connected, through an A/D converter 26, with a DVP 27, where a luminance signal (Y) and color-difference signal (C) are generated. Then the luminance signal is input to the microcomputer 68, which supplies the control signal for luminance regulation to the above-mentioned electronic shutter circuit 66, which in turn variably controls the shutter speed according to this luminance control signal to regulate the amount of light received by the CCD 12 (light exposure).

The microcomputer 68 checks, based on the above-mentioned luminance signal, whether the current luminance of the image is optimum as well as detects the speed of the electronic shutter. If it is judged that the current luminance of the image is not sufficient even if the electronic shutter is set at the lowest speed (at full aperture), it issues a command signal to the lamp voltage control circuit 73, instructing it to raise the voltage of the lamp voltage. This command to raise the voltage is executed based on detection of the upper and lower limits of the lamp voltage.

Figure 6:
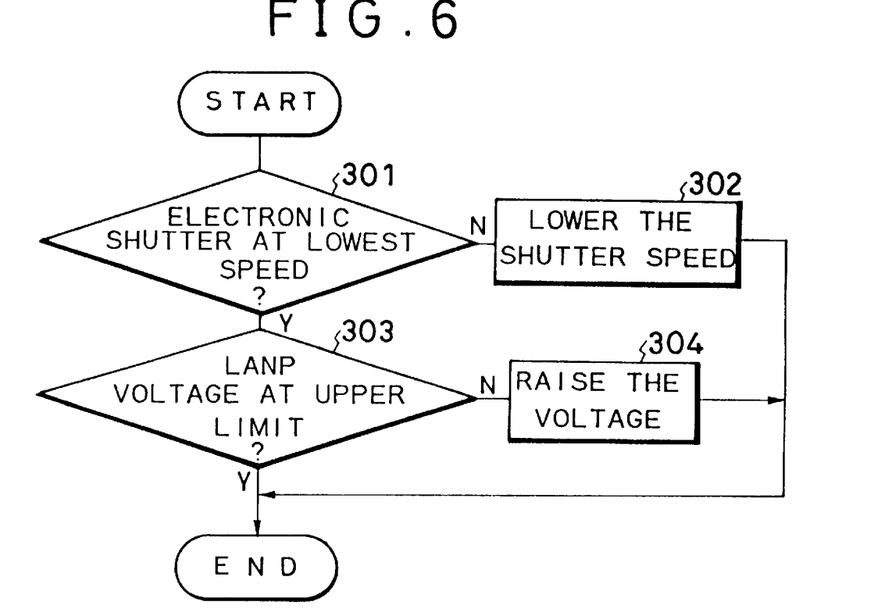
FIG. 6 is a flow chart describing how to increase the amount of light to be emitted according to the second embodiment of the present invention.
Figure 7:
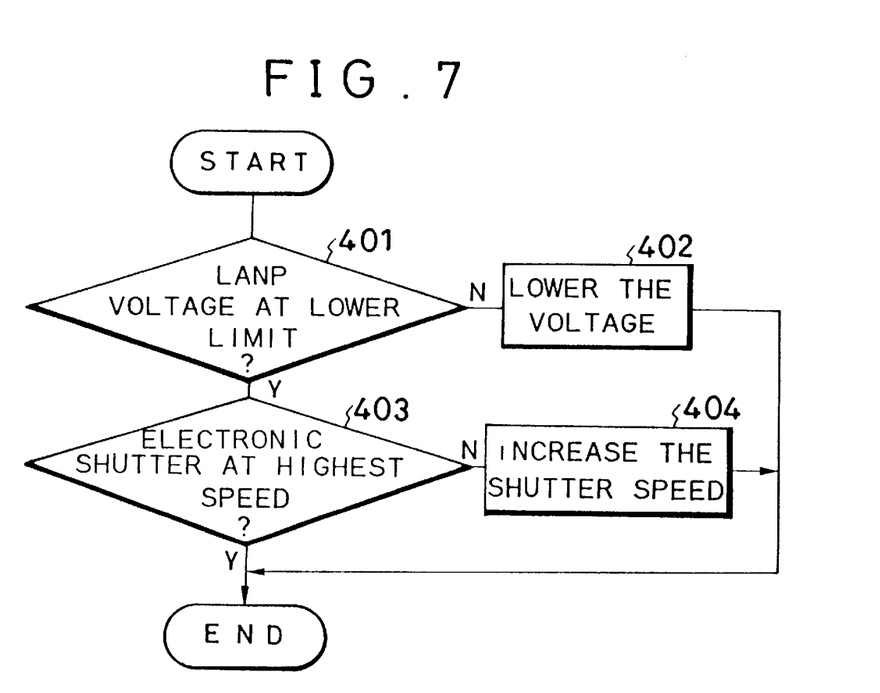
FIG. 7 is a flow chart describing how to decrease the amount of light to be emitted according to the second embodiment of the present invention.

Now, the operation of the second embodiment, which has the above-mentioned configuration, will be described with reference to FIGS. 6 to 8. FIG. 6 shows how to increase the light exposure while FIG. 7 shows how to decrease the light exposure. If the microcomputer 68 determines, based on the luminance signal received from the DVP 27, that the light exposure (amount of light to be received by the CCD) needs to be increased, the procedure described in FIG. 6 is performed. If it is determined that the light exposure needs to be decreased, the procedure described in FIG. 7 is performed.

When increasing the light exposure in FIG. 6, the microcomputer 68 determines in Step 301 whether the electronic shutter is set at the lowest speed ($\frac{1}{60}$ second—at full aperture). If the answer is "N (No)", it gives a command signal to the electronic shutter circuit 66 in Step 302, instructing it to take an action to lower the shutter speed. If the answer is "Y (Yes)", it goes to Step 303. In Step 303, the microcomputer 68 determines whether the lamp voltage is at its upper limit V2. If the answer is "N", it gives a command signal to the lamp voltage control circuit 73 in Step 304, instructing it to raise the lamp voltage. If the answer is "Y", which means control limits, it finishes processing.

When decreasing the light exposure in FIG. 7, the microcomputer 68 determines in Step 401 whether the lamp voltage is at its lower limit V1. If the answer is "N", it gives a command signal to the lamp voltage control circuit 73 in Step 402, instructing it to lower the lamp voltage. If the answer is "Y", it goes to Step 403 to perform normal electronic shutter operation. In Step 403, the microcomputer 68 determines whether the electronic shutter is at the highest speed (for example, 1/100,000 second). If the answer is "N", it gives a command signal to the electronic shutter circuit 66 in Step 404, instructing it to take an action to increase the shutter speed. If the answer is "Y", it finishes processing.

Figures 8, 8A, 8B, 8C:
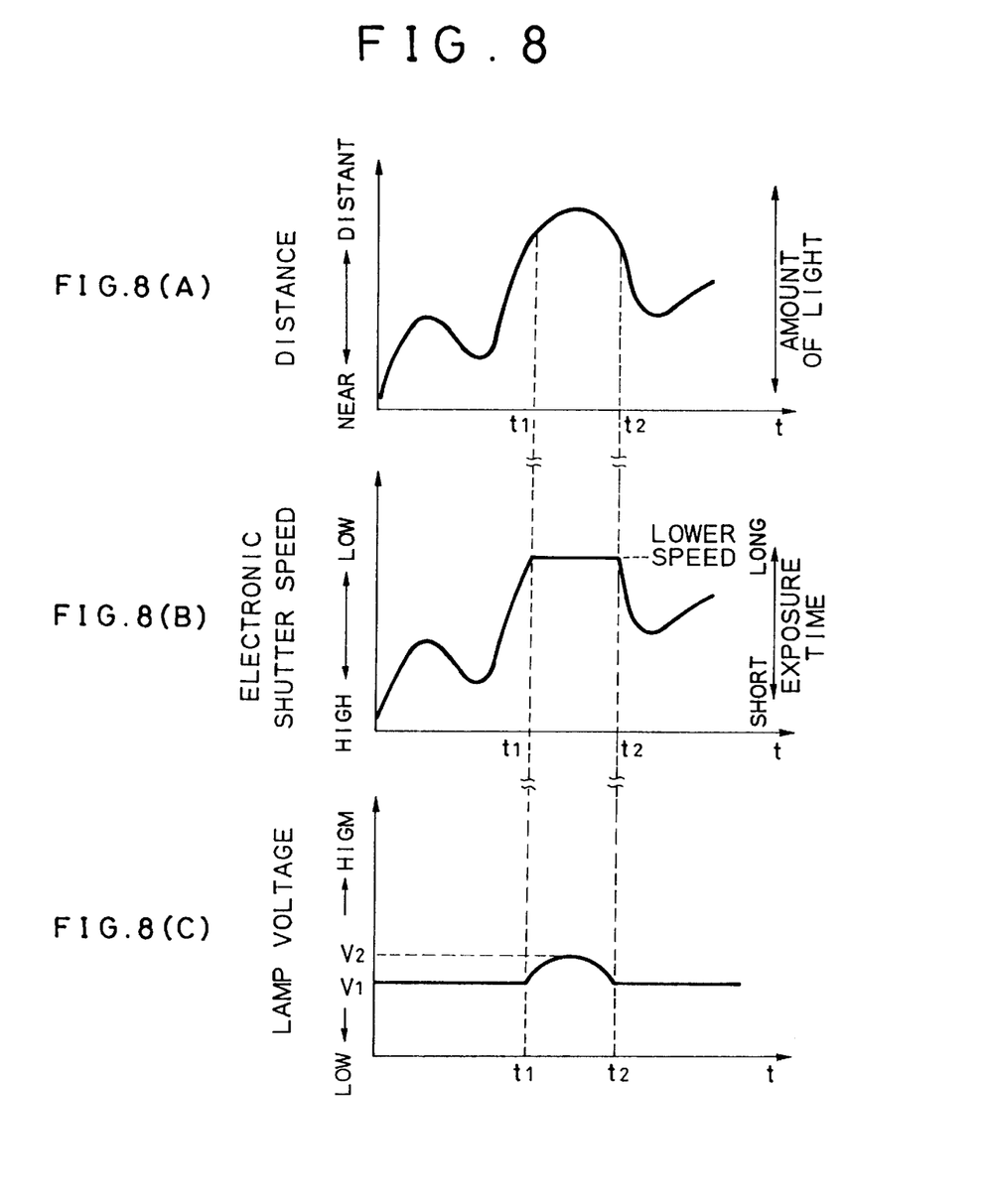
FIGS. 8(A) to 8(C) are diagrams showing states of light control according to the second embodiment of the present invention with FIG. 8(A) representing the relationship between shooting distance and the required amount of light, FIG. 8(B) representing the control of the electronic shutter, and FIG. 8(C) representing the control of lamp voltage.

In this way, the amount of light is controlled as shown in FIG. 8. To be more specific, let the horizontal axis represent time, and the vertical axis—distance, as shown in FIG. 8(A). Consider the long-distance section on the vertical axis where a large amount of light is required. After the lowest shutter speed is reached at t1 in FIG. 8(B), the amount of light remains insufficient until t2 in the figure. In the range between t1 and t2, however, the lamp voltage is controlled variably between V1 and V2 (for example, in 20 incremental steps of 0.1 V from 13 V to 15 V) according to the distance as shown in FIG. 8(C). This secures the required amount of light in the range between t1 and t2 shown in FIG. 8(A).

Accordingly, it is possible to obtain sufficiently bright images even during long range observation. Furthermore, in the normal control range of the electronic shutter, since the lamp voltage remains at V1, which does not abuse the lamp, there is an advantage that the life of the lamp 21 is prolonged.

Thus, the second embodiment also has the advantage of providing a prolonged lamp life in addition to providing sufficiently bright images during long range observation without using any high-cost and high-output lamp.

What is claimed is:

1. A light control system for electronic endoscopes comprising:

an image sensor for obtaining an image of the object under observation;

a light source for illuminating the object under observation;

a diaphragm for variably regulating the light output from said light source so that the luminance of the image is optimum;

a diaphragm drive circuit for driving said diaphragm variability;

a light-source voltage control circuit for controlling a light-source voltage to change brightness of the said light source itself; and means for control which controls said light-source voltage control circuit, supplies a constant light-source voltage to said light source under normal shooting conditions, and raises said light-source voltage only when it is judged, based on the detected luminance signal of the image of the object under observation obtained by said image sensor, that the luminance of the image will be insufficient even with the diaphragm fully open.

2. A light control system for electronic endoscopes comprising:

an image sensor for obtaining an image of the object under observation;

a light source for illuminating the object under observation;

an electronic shutter circuit for controlling the amount of light to be received by an image sensor, by controlling an electronic charge storage time of the image sensor as an electronic shutter speed so that the luminance of the image is optimum;

a light-source voltage control circuit for controlling the light-source voltage to change the brightness of the said light source itself; and means for control which controls said light-source voltage control circuit, supplies a constant light-source voltage to said light source under normal shooting conditions, and raises said light-source voltage only when it is judged, based on the detected luminance signal of the image of the object under observation obtained by said image sensor, that the luminance of the image will be insufficient even if the electronic shutter is set at the lowest speed.

* * * * *